US005612293A

United States Patent [19]
Swartwout et al.

[11] Patent Number: 5,612,293
[45] Date of Patent: Mar. 18, 1997

[54] DRILL-IN FLUIDS AND DRILLING METHODS

[75] Inventors: Rosa T. Swartwout; Stephen Stroh, both of Houston, Tex.

[73] Assignee: Tetra Technologies, Inc., The Woodlands, Tex.

[21] Appl. No.: 362,809

[22] Filed: Dec. 22, 1994

[51] Int. Cl.$^6$ ............................... C09K 7/02; C09K 7/00; E21B 43/26; E21B 33/138
[52] U.S. Cl. .................. 507/110; 507/101; 507/111; 507/201; 507/212; 507/117; 175/72
[58] Field of Search .................. 507/110, 201, 507/101, 111, 212; 252/8.5 A

[56] References Cited

U.S. PATENT DOCUMENTS

| | | | |
|---|---|---|---|
| 2,073,413 | 3/1937 | Cross | 255/1 |
| 2,165,824 | 7/1939 | Vietti | 255/1 |
| 2,393,174 | 1/1946 | Larsen | 252/8.5 |
| 3,318,396 | 5/1967 | Tailleur et al. | 175/72 |
| 3,561,548 | 2/1971 | Mondshine | 175/65 |
| 3,878,110 | 4/1975 | Miller | 252/8.5 B |
| 3,960,736 | 6/1976 | Free et al. | 252/855 R |
| 3,988,246 | 10/1976 | Hartfiel | 252/8.5 A |
| 4,046,197 | 9/1977 | Gruesbeck | 166/305 R |
| 4,140,639 | 2/1979 | Jackson | 252/8.5 A |
| 4,151,096 | 4/1979 | Jackson | 252/8.5 A |
| 4,155,410 | 5/1979 | Jackson | 252/8.5 A |
| 4,172,801 | 10/1979 | Jackson | 252/8.5 A |
| 4,175,042 | 11/1979 | Mondshine | 252/8.55 R |
| 4,186,803 | 2/1980 | Mondshine | 166/292 |
| 4,192,756 | 3/1980 | Mondshine | 252/8.55 R |
| 4,247,402 | 1/1981 | Hartfiel | 252/8.5 A |
| 4,369,843 | 1/1983 | Monshine | 166/292 |
| 4,422,947 | 12/1983 | Dorsey et al. | 252/8.5 C |
| 4,459,188 | 7/1984 | Rutherford | 204/98 |
| 4,554,081 | 11/1985 | Borchardt | 252/8.5 A |
| 4,596,490 | 6/1986 | Van Fossan | 405/53 |
| 4,615,740 | 10/1986 | Pelezo | 106/177 |
| 4,619,773 | 10/1986 | Heilweil | 252/8.514 |
| 4,619,776 | 10/1986 | Mondshine | 252/8.551 |
| 4,620,596 | 11/1986 | Mondshine | 166/292 |
| 4,621,692 | 11/1986 | Mondshine | 166/281 |
| 4,822,500 | 4/1989 | Dodson | 252/8.551 |
| 4,941,982 | 7/1990 | Dadger et al. | 252/8.551 |
| 5,028,302 | 7/1991 | Rutherford | 204/98 |
| 5,126,059 | 6/1992 | Rutherford | 204/98 |
| 5,228,524 | 7/1993 | Johnson | 175/72 |
| 5,238,065 | 8/1993 | Mondshine | 166/300 |
| 5,247,995 | 9/1993 | Tjon-Joe-Pin et al. | 507/201 |
| 5,253,711 | 10/1993 | Mondshine | 166/300 |
| 5,325,921 | 7/1994 | Johnson | 175/72 |

FOREIGN PATENT DOCUMENTS

| | | |
|---|---|---|
| 0259939A2 | 3/1988 | European Pat. Off. . |
| 0259939A3 | 3/1988 | European Pat. Off. . |
| 672740A1 | 9/1995 | European Pat. Off. . |
| 2394596 | 1/1979 | France . |
| 2104575 | 3/1983 | United Kingdom . |

OTHER PUBLICATIONS

Presentation Foils entitled "Drill–in Fluids," Jun. 30, 1993. Baker Hughes Inteq 1010 Rankin Dr., Houston, TX, 77073.

Report entitled "Perfflow, An Effective System for Leak–Off Control," Jun. 30, 1993, Baker Hughes Inteq (Baker Sand Control) 1010 Rankin Rd., Houston TX, 77073.

Article entitled "QC Test Procedures and Product Specifications for Perfflow DIF HD," Feb. 7, 1994, Baker Hughes Inteq P.O. Box 61486, Houston, TX 77208–1486.

Technical Services Report entitled "M–70 Carbonate Bridging Agent," Feb. 15, 1994. Baker Hugh Inteq, 1010 Rankin Rd. Houston, TX 77073.

Article entitled "The Most Asked Questions Regarding Perfflow," by Baker Hughes Inteq Tech Services Department, Apr. 7, 1994, 1010 Rankin Road, Houston, TX 77073.

Report entitled "Properties & Performance of the Perfflow System," by Bill Chesser, Apr. 7, 1994. Baker Hughes Inteq, 1010 Rankin Road, Houston, TX 77073.

Report entitled Perfflow Drill–In Fluid Application, Samedan, OCS–G 6086, Well B–5, Block A–53, Brazos Area, Offshore, Texas, Apr. 14, 1994. Available from Baker Hughes Inteq, 7000 Hollister St., Houston, TX, 77040–5337.

Letter to Mr. Marvin Brandt from Mr. William Halliday, regarding Drill–In Fluid Application for Ewing Bank 873, May 26, 1994. Baker Hughes Intec, 7000 Hollister St., Houston, TX 77040–5337.

Report entitled "Comparison of Perfflow to Available Drill–In Fluids," by Bill Chesser and Allen Garrysch, Oct. 7, 1994. Baker Hughes Inteq 1010 Rankin Rd. Houston, TX 77073.

Paper entitled "The Perfflow DIF System, A Drill–In and Under–reaming Fluid," dated after Jun. 1994. Baker Hughes Inteq 7000 Hollister, Suite 300, Houston Texas 77040–5337.

*Primary Examiner*—David B. Springer
*Attorney, Agent, or Firm*—Tobor & Goldstein, L.L.P.

[57] ABSTRACT

There is provided a method of drilling an oil or gas well, comprising drilling a wellbore into an underground formation in which a drill bit at the lower end of a drill pipe is placed at the bottom of the wellbore; pumping a first drilling fluid into the wellbore; determining the producing zone of the underground formation; and introducing a second drilling fluid into the wellbore through the drill pipe when the borehole is within the producing zone of the underground formation, wherein the second drilling fluid is a high density drill-in fluid, having a composition different from that of the first drilling fluid and including a brine system with at least one dissolved monovalent salt and at least one dissolved divalent salt together with a suspension polymer, said drilling fluid having a density of at least about 1.50 g/cm$^3$ and a plastic viscosity of less than about 50 lbs/100 ft$^2$.

18 Claims, No Drawings

DRILL-IN FLUIDS AND DRILLING METHODS

BACKGROUND

1. Field of Invention

The present invention relates broadly to treatment of wells and wellbores. In a preferred aspect, the invention relates to oil well drilling operations, particularly drill-in operations, and more particularly to novel drill-in fluids and methods of drilling involving the use of at least two different drilling fluids, one of which is a novel drill-in fluid.

2. Background Art

Drilling operations typically involve mounting a drill bit on the lower end of a drill pipe or "drill stem," which may then be rotated against the bottom of a hole to penetrate a formation and create a borehole. A drilling fluid, typically a drilling mud, may be circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole. Another type of fluid used in oil and gas wells, distinguishable from drilling fluids, is a "completion fluid," which herein refers to any fluid that is pumped down a well after drilling operations are completed, and will refer broadly to fluids introduced during acidizing, perforating, fracturing or workover operations. In a preferred aspect, the present invention is directed to drilling fluids.

In one aspect the present invention relates to a specific type of drilling fluid, namely a "drill-in" fluid, which is pumped through the drill pipe while drilling through the "payzone," which refers to the part of the underground formation or reservoir of an oil or gas well that is believed to hold the oil or gas to be removed, i.e., the "producing" part of the formation. In another aspect, the invention relates to a method for drilling an oil or gas well requiring the use of at least two different types of drilling fluids, one for the initial surface formations, the other through the payzone. When the lower end of the drill pipe enters the payzone, it is often desirable to protect the formation from damage and fluid loss.

Many drilling fluids are unacceptable as drill-in fluids. For example, many drilling fluids have relatively high viscosities at high shear rates, which makes them undesirable due to the mechanical constraints they often place upon the drilling equipment and damage to the reservoir itself. A fluid with high viscosities at high shear rates often tends to require high pump pressures which may exceed the capabilities of the system pumping the fluid, e.g., the pump system on the drilling rig. One solution might be to reduce the pump rate to accommodate the constraints on the equipment and reservoir. But reduction in pump rate generally requires a corresponding reduction in drilling rate, which can significantly increase the overall cost of drilling a well. Another solution might be to provide pumps with higher pumping capabilities. But in addition to cost and damage, higher pump pressures may result in breakdown of the formation.

Higher viscosities tend to result in higher pressures exerted outward on the borehole, which may result in mechanical damage to the formation, thus reducing the ability of a well to produce oil or gas. This may be particularly true with slimhole drilling operations, where small diameter pipe is used to pump fluids through the hole at high pressures. Higher viscosity fluids may result in inadvertent fracturing of the formation, which may create a need to stop drilling operations to seal the fracture. Further, the fracture damage may be so severe that the well is permanently unable to produce oil or gas.

Examples of fluids that are unacceptable for use as drill-in fluids are shown in U.S. Pat. No. 4,822,500. There, well treating fluids were prepared using single salt brines, namely saturated sodium chloride brine systems. The densities of those fluids were too low for use in high pressure formations. Moreover, increasing the densities of those fluids also increased plastic viscosities to unacceptable levels. As indicated in Table IV of that patent, the lower plastic viscosities tended to be obtained only at densities less than 1.50 g/cm$^3$. A fluid having a density of 1.50 g/cm$^3$ in Table IV was reported to have an extremely high plastic viscosity of 60 lb/ft$^2$, which the present inventor considers unacceptable for use in the payzone, i.e., as a drill-in fluid, because it might tend to cause inadvertent fracturing. Another problem with the drilling fluids reported in that patent is the need to add solid weighting agents to the base brine to increase its density above 1.2 g/cm$^3$. The addition of such weighting agents tends to cause increase in filter cake formation and plastic viscosity, making it less desirable as a drill-in fluid.

Use of divalent salts may also present problems in drilling fluids, particularly in drilling fluids. For example, polymers commonly used as suspending agents, particularly polymers belonging to the genus xanthamonas gum (xanthan gum) are intolerant of divalent salts, and tend to form precipitates and other undesirable solid byproducts. Those polymers do not hydrate properly with the divalent salts and accordingly may not impart the desired viscosity to the base brine. Other polymers, such as hydroxyethyl cellulose (HEC), often incorporated in completion fluids, do not provide the desired suspension qualities to the fluid. Still others may react with the base brine to create solids or other undesirable byproducts.

Accordingly, there exists a continuing need for a high density well treatment fluid that would be useful as a drill-in fluid and would overcome one or more of the identified shortcomings.

SUMMARY OF INVENTION

The present invention is directed broadly to a well treatment method and composition and preferably to a drilling method and composition having a high density brine component ("base brine") comprising at least one monovalent salt and at least one divalent salt and a polymer component comprising a particular class of polymer that functions as a divalent salt compatible viscosifying agent and a suspension polymer. An example of such a polymer is a thixotropic polysaccharide polymer containing sclerotium glucamigum fungus.

The unique ingredients of the invention composition have been found to result in properties that make the composition highly appropriate for use as a drill-in fluid. In particular, the drilling fluid of this invention, used in a drilling method, may be a drill-in fluid having a relatively high density, preferably ranging from at least about 1.40 to 2.30 g/cm$^3$. In an advantageous aspect, the base brine of the invention has a density of at least about 1.30 g/cm$^3$ and preferably up to about 2.30 g/cm$^3$. In a broader aspect, the present invention is directed to a method of treating a wellbore by drilling, completion or otherwise, comprising the step of introducing to the wellbore a composition of the invention described herein.

Another desirable feature of the invention is the relatively low plastic viscosity of the polymer-brine composition at high densities. Specifically, the plastic viscosity is less than about 50, preferably less than about 40 and more preferably less than about 30. (The plastic viscosities referenced herein are in lbs/100 ft$^2$.) Advantageously, the density of the drilling fluid of this invention may be increased by increasing the density of the base brine without increasing viscosity or adding solid weighting agents. With this invention, the risk of inadvertent fracturing is minimized.

DETAILED DESCRIPTION AND PREFERRED EMBODIMENTS

As discussed above, the invention is directed to a wellbore treatment composition, preferably a high density drilling fluid, which includes a brine system (also referred to as a "base brine" or "brine component") combined with a compatible viscosifying suspension polymer component, for example, at least one polymer that is a suspending agent (or "suspension polymer"), is compatible with the divalent salt in the base brine, and is capable of viscosifying the base brine. In a critical aspect, the brine system includes at least one monovalent salt and at least one divalent salt. The inventor has discovered that, surprisingly, when the polymer of this invention is combined with a base brine that includes at least one monovalent salt and at least one divalent salt the drilling fluid has a relatively low plastic viscosity without sacrificing gel strength in the drilling fluid. The criticality of this particular combination and its properties have not been heretofore recognized. The drilling fluid preferably has a density of at least about 1.40 g/cm$^3$ and the base brine a density of at least about 1.30 g/cm$^3$. And, where the only ingredients of the drill-in fluid are water, dissolved monovalent and divalent salts, and viscosifying suspension polymer, the density of the base brine may be substantially the same as the density of the drill-in fluid.

A polymer of the invention should be a compatible viscosifying agent. In particular, the polymer should be capable of hydrating in the presence of the divalent salt in the base brine, particularly calcium or zinc halide, and imparting viscosity to the fluid. Preferably, the polymer does not form any substantial precipitates or other solid byproducts, which would tend to increase the possibility of inadvertent fracturing and cause formation damage. In the presence of the monovalent and divalent salts of the base brine, the polymer of this invention preferably forms no more than about 5 wt % and more preferably less than about 1 wt % solids. In contrast, certain other polymers, such as xanthan gum (XC polymer), do not provide the desired viscosity to the system in the presence of divalent salts and would not be compatible within the meaning of this patent.

The polymer of this invention should also be thixotropic and act as a suspending agent ("suspension polymer"), being capable of forming a gel at low shear rates. Certain polymers, such as hydroxyethyl cellulose (HEC), are not useful with this invention since they do not act as effective suspension agents.

In another broad aspect, the invention is directed to a method of drilling an oil or gas well, which includes introducing to the payzone a base brine containing at least one monovalent salt and at least one divalent salt. While a single drilling fluid may be used for the entire drilling operation, the method of this invention in a specific embodiment is directed to a method of drilling in which at least two drilling fluids are introduced to the wellbore, each having a different composition. The first drilling fluid, such as drilling mud, typically comprises non-degradable materials, such as clay particulate materials, such as barite and/or bentonite. The second drilling fluid, referred to herein as a "drill-in" fluid, comprises an aqueous base brine that preferably has no clays or other suspended solid particulates and includes at least one monovalent salt and at least one divalent salt. The drill-in fluid of the invention also includes a polymer component that includes a polymer compatible with the divalent salt, preferably the viscosifying suspension polymer discussed above. In practicing the method of this invention, another drilling fluid may be used, namely one that includes a filtrate loss component such as solid bridging agents or starch. However, it is desirable to rely primarily on the second drilling fluid described above when drilling through the payzone. In the multiple-fluid method of the invention, the first drilling fluid is used in the initial stages of the drilling operation, for example, while "spudding in" or drilling through the upper non-producing formation layers. The drill-in fluid may be introduced through the drill pipe when the drill bit is in the producing part of the underground formation of an oil or gas well, sometimes referred to as a payzone, and may be introduced to the formation at any time before or after the drill stem enters a payzone.

A desirable characteristic of a drilling fluid is its high density together with its ability to flow easily at high velocities. In rheological terms, the fluid (and preferably the brine itself) should have a high density, preferably at least about 1.30 g/cm$^3$, more preferably at least about 1.50 g/cm$^3$ and a relatively low plastic viscosity, i.e., less than about 50. In a preferred aspect, the plastic viscosity is less than about 40, and is more preferably less than about 30. Another desirable rheological property is yield point, which should be at least about 5, preferably from about 5 to 30 lbs/100 ft$^2$.

The high density of the brine system is particularly desirable in drill-in operations, where one wishes to avoid high concentrations of solids, which as discussed in the background of this patent tends to result in inadvertent fracturing and which could damage the formation. An advantage of this invention is that high densities are achievable without either adding particulate weighting agents or forming solids or other undesirable byproducts. Accordingly, the drilling fluid of this invention preferably is used as a drill-in fluid, and consists essentially of the base brine and the suspension polymer, without starch or particulate salts. But in certain applications the fluid may also comprise other ingredients, such as a bridging agent, which is preferably a starch and/or particulate solids, including salts such as granulated calcium carbonate or sodium chloride.

The term "monovalent salts" in this patent refers broadly to salts with single valence cations, i.e., salts having a positive ion with a single charge. For example, the monovalent cation may be an alkali metal from Group IA of the Periodic Table, particularly sodium, lithium, or potassium. Another monovalent cation is ammonium. The anions of the monovalent salts are not believed to be particularly critical. They may be, for example, halogen ions from Group VIIA of the Periodic Table, particularly, fluoride, chloride or bromide. Other anions of the monovalent salt include formates or nitrates. A presently preferred monovalent salt is sodium bromide, but sodium chloride, lithium bromide, or ammonium chloride are also contemplated.

The term "divalent salts" in this patent refers broadly to salts with double valence cations, i.e., salts having a positive ion with a double charge. For example, the divalent cation may be an alkaline earth metal from Group IIA of the Periodic Table, particularly magnesium or calcium. The divalent cation may also be a heavy metal ion such as zinc. The anions of the divalent salts, not critical, may be, for example, nitrates or halides from Group VIIA of the Periodic Table, particularly, fluoride, chloride or bromide. Specific divalent salts include calcium chloride, calcium bromide, magnesium bromide, and zinc bromide.

In a specific embodiment of the invention, the monovalent and divalent salts of the base brine have concentrations ranging from about 1 wt % to saturation levels. However, unlike other brine systems, such as those in U.S. Pat. No. 4,822,500, the brine systems of certain embodiments of this invention need not be saturated. Also, with the present invention, concentrations of the monovalent and divalent salts in the brine system may be adjusted based on the particular salts used, the reservoir conditions, and other components present in the drilling fluid. In particular, the amount of dissolved salts should bear some relationship to the target density. Preferably, the base brine is a "clear brine" system, meaning that the salts are completely dissolved in solution. While the base brine may be saturated with the salts, the salts are preferably not present above saturation levels; otherwise, the undissolved salt precipitates may clog or damage the formation, and such a brine system would not be considered a clear brine.

An advantage of the present invention is that density of the drilling fluid may be increased without affecting other important properties of the drilling fluid, by merely increasing the salt concentration. Preferably, the salts together comprise at least about 1 to 80 wt % of the brine system, with each salt comprising from at least about 0.5 wt % to about 70 wt % of the brine system. In a specific embodiment of the invention, a clear brine system is provided comprising from about 5 to 50 wt % monovalent salt, e.g., NaBr, from about 5 to 50 wt % divalent salt, e.g., $ZnBr_2$, and from about 10 to 90 wt % water.

In addition to the brine system and suspension polymer, the drilling fluid may contain other ingredients as well. For example, bridging agents, such as calcium carbonate or sodium chloride particles, may be used. In some systems, it may be necessary for the brine system to be saturated, so that the bridging particles do not dissolve but rather exist in particulate form. For example, when controlling fluid loss, it may be desirable to include solid bridging agents, such as soluble salts, particularly sodium chloride, in which case it may be desirable for the brine to be saturated.

An ingredient that is part of a preferred embodiment of this invention is a starch, which is conventional and will be readily known to persons skilled in the art. Typically, starches are added as fluid loss agents, but they may also be considered a bridging agents. Examples of starch include pregelatinized or prehydrolyzed starches, corn starch, and tapioca flour. A presently preferred starch is a crosslinked starch, in particular, phosphorus oxychloride crosslinked starch.

Other possible ingredients include a bridging agent, such as galena, iron oxide, $Mn_3O_4$, glass beads, gravel, oil soluble resins and the like; a pH control agent, such as calcium hydroxide or magnesium hydroxide; defoaming agents; temperature stabilizers and bactericides.

Many other ingredients, not listed above, may also be incorporated into the drilling fluid of this invention, either as part of the clear brine system or as separate components to be added to the drilling fluid. However, it is preferred that those other components not adversely affect the performance of the drilling fluid, particularly in the producing part of the formation, particularly the rheological properties such as plastic viscosity, yield point, and gel strength.

EXAMPLES

A series of tests was conducted which demonstrate certain physical properties of the drilling fluids of the invention. Results are indicated in Table 1. The procedures used for measuring the plastic viscosity (PV) and yield point (YP) of the fluids in the Examples below are found in the Standard Procedure for Field Testing Drilling Fluids, API Recommended Practice 13B (RP 13B), Eleventh Edition, May 1, 1985. The direct-indicating viscometer procedure was followed, in particular, a Fann rheometer, Model 35A was used. As described in Section 2.5 of that test procedure, the drilling fluid samples were placed in a thermostatically controlled viscometer cup and heated to the desired temperatures. In a slight modification of the standard procedure, viscosity measurements were taken at 600, 300, 200, 100, 59, 6 and 3 rpm to develop a viscosity profile. The Plastic Viscosity (in $lbs/100\ ft^2$) was calculated as the difference between the viscosity measurement at 600 rpm and the viscosity measurement at 300 rpm. Yield point was calculated as the viscosity reading at 300 rpm minus the Plastic Viscosity.

Example 1

A first drilling fluid sample was prepared from a clear brine having a concentration of 36.5 wt % water, 20 wt % NaBr and 43.5 wt % $ZnBr_2$, and a density of 15.7 lb/gal (1.88 $g/cm^3$). A quantity of the brine (630 ml) was thoroughly mixed with calcium carbonate, a suspension polymer, and a starch to form a high density drilling fluid. In particular, one hundred grams of calcium carbonate was added (50 lb/bbl) to the brine, as well as 36 grams of Perfflow® W-306 (1.8 gal/bbl), a proprietary drilling fluid additive commercially available from Baker Hughes, containing a polysaccharide polymer and a starch. The brine sample was mixed for 30 minutes at about 130° F., then tested at 150° F. in accordance with RP 13B-2 to obtain a PV of 22 and a YP of 12. A viscosity profile is shown in Table 1 below. The same fluid was then measured at 124° F. to give a PV value of 26 and YP of 19. Next, after aging the sample by hot-rolling at 200° F., the sample was measured at 150° F. to give a PV of 23 and YP of 5.

TABLE 1

| SHEAR RATE (RPM) | VISCOMETER READINGS ($lb/100\ ft^2$) |
| --- | --- |
| 600 | 56 |
| 300 | 34 |
| 200 | 26 |
| 100 | 17 |
| 59 | 12 |
| 6 | 5.5 |
| 3 | 5 |
| Plastic Viscosity | 22 |
| Yield Point | 12 |

Example 2

A second drilling fluid sample was prepared using the brine sample of Example 1. The same amount of brine (630 ml) was mixed with 40 grams of Perfflow® W-306 (2.0 gal/bbl) and 100 grams of calcium carbonate (50 lbs/bbl). At 120° F., the PV was 32 and YP was 24. At 150° F., the PV was 34 and YP was 22.

TABLE 2

| SHEAR RATE (RPM) | VISCOMETER READINGS (lb/100 ft$^2$) |
|---|---|
| 600 | 90 |
| 300 | 56 |
| 200 | 43 |
| 100 | 27 |
| 59 | 20 |
| 6 | 7 |
| 3 | 6 |
| Plastic Viscosity | 34 |
| Yield Point | 22 |

While this invention has been described with reference to certain specific examples and embodiments, a person skilled in the art will recognize many variations from the examples and embodiments based on the information in this patent without departing from the overall invention. For example, although the compositions described herein are particularly appropriate as drill-in fluids, they may also be useful while drilling through non-producing formations, particularly those which would benefit from the unique properties provided by the invention. The composition of this invention may also be used in non-drilling operations, such as well completions in which a brine-based composition of the invention is desired for fluid-loss purposes. It may also be useful as or with gravel pack carrier fluids, fracturing fluids, and fluid diverting operations. Further, it is contemplated that the fluid composition may be useful in well washing workover operations where small diameter pipe is used and where lower viscosity and additional gel strength is desired; Finally, the composition is not limited to oilfield applications, but may be applied, for example, in geothermal, mining and waterwell drilling. More generally, the composition may be used in any wellbore treatment application including wellbore lengthening, enlarging, or widening (underreaming), or any other operation directed to changing the wellbore geometry. Accordingly, the claims below are intended to cover all changes and modifications of the invention which provide similar advantages and benefits and do not depart from the spirit of the invention.

What is claimed is:

1. A high density drilling fluid comprising a high density base brine, which includes at least one dissolved monovalent salt and at least one dissolved divalent salt, and a viscosifying suspension polymer, wherein said base brine has a density of at least about 1.30 g/cm$^3$ and said drilling fluid has a plastic viscosity of less than about 40 lbs/100 ft$^2$ when measured at a temperature of 150° F. or less, and wherein said base brine is an unsaturated clear brine system.

2. A wellbore treatment fluid comprising a base brine which includes at least one dissolved monovalent salt and at least one dissolved divalent salt and a viscosifying suspension polymer, said treatment fluid having a density of at least about 1.30 g/cm$^3$ and a plastic viscosity of less than about 50 lbs/100 ft$^2$ when measured at a temperature of 150° F. or less, and wherein said base brine is an unsaturated clear brine system.

3. A method of drilling an oil or gas well, comprising the steps of:

drilling a wellbore into an underground formation in which a drill bit at the lower end of a drill pipe is placed at the bottom of the wellbore; and introducing a drill-in fluid into the wellbore through the drill pipe when the borehole is within the producing zone of the underground formation wherein said drilling fluid exists the drill bit and is returned to the surface through the annular space between the outside of the drill pipe and the wellbore wall;

wherein said drill-in fluid is a high density drill-in fluid with a base brine that has a density of at least about 1.30 g/cm$^3$ and includes water, at least one dissolved monovalent salt and at least one dissolved divalent salt, said drill-in fluid also including a viscosifying suspension polymer and having a plastic viscosity of less than about 50 lbs/100 ft$^2$ when measured at a temperature of 150° F. or less, and wherein said base brine is an unsaturated clear brine system.

4. The method of drilling an oil or gas well of claim 3 additionally comprising the step of introducing another drilling fluid, prior to the introduction of the drill-in fluid, said other drilling fluid comprising suspended solids.

5. The fluid of claim 1 in which the viscosifying suspension polymer comprises a thixotropic polysaccharide.

6. The fluid of claim 1 in which the polymer is capable of hydrating in the presence of the divalent salt.

7. The fluid of claim 1 in which the polymer imparts viscosity to the base brine without forming substantial precipitates or other solid byproducts.

8. The fluid of claim 1 in which the plastic viscosity is less than about 40 lbs/100 ft$^2$ when measured at a temperature of 150° F.

9. The fluid of claim 1 in which the plastic viscosity is less than about 30 lbs/100 ft$^2$ when measured at a temperature of 150° F.

10. The fluid of claim 1 additionally comprising a starch.

11. The fluid of claim 1 additionally comprising a particulate bridging agent.

12. The fluid of claim 1 additionally comprising a particulate bridging agent comprising granulated calcium carbonate or sodium chloride.

13. The fluid of claim 1 in which the base brine is a clear brine and in which the monovalent and divalent salts in the brine system are present in a concentration of about 1 wt % or greater.

14. The fluid of claim 1 in which the monovalent salt and divalent salt are each present in an amount constituting at least about 5 wt % of the base brine.

15. The fluid of claim 1 in which the monovalent salt comprises a member of Group IA and the divalent salt comprises a member of Group IIA.

16. The fluid of claim 1 in which the monovalent salt comprises sodium, potassium, ammonium, or lithium and the divalent salt comprises calcium, magnesium, or zinc.

17. The fluid of claim 1 in which the negative ions of the monovalent and divalent salts comprise halides, nitrates or formates.

18. The fluid of claim 1 in which the monovalent salt comprises sodium bromide and the divalent salt comprises zinc bromide.

* * * * *